United States Patent
Yang et al.

(10) Patent No.: US 12,046,888 B2
(45) Date of Patent: Jul. 23, 2024

(54) CONTROL CIRCUIT WITH OVERCURRENT PREDICTION TO DRIVE CAPACITIVE LOAD

(71) Applicant: TEXAS INSTRUMENTS INCORPORATED, Dallas, TX (US)

(72) Inventors: YuQing Yang, Plano, TX (US); Hua Cao, Shanghai (CN); YuRong Wan, Shanghai (CN); Xiaolin Qin, Shanghai (CN); Weiyu Shen, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 561 days.

(21) Appl. No.: 17/080,518

(22) Filed: Oct. 26, 2020

(65) Prior Publication Data
US 2021/0391702 A1    Dec. 16, 2021

Related U.S. Application Data

(63) Continuation of application No. PCT/CN2020/096183, filed on Jun. 15, 2020.

(30) Foreign Application Priority Data

Jun. 15, 2020  (WO) ................ PCT/CN2020/096183

(51) Int. Cl.
 *H04R 17/00* (2006.01)
 *H02H 1/00* (2006.01)
 *H02H 9/02* (2006.01)
(52) U.S. Cl.
 CPC ............ *H02H 1/0007* (2013.01); *H02H 9/02* (2013.01); *H04R 17/00* (2013.01)

(58) Field of Classification Search
 CPC .................... H04R 17/00–10; H02H 9/02–028
 See application file for complete search history.

(56) References Cited

U.S. PATENT DOCUMENTS

2010/0226513 A1*  9/2010  Kuroda ..................... H03F 1/32
                                                  381/120
2016/0261245 A1*  9/2016  Pfaffinger ............... H03F 3/181

FOREIGN PATENT DOCUMENTS

JP      2005109665 A  *  4/2005

OTHER PUBLICATIONS

Translation of JP2005109665A. Apr. 2005. (Year: 2005).*

* cited by examiner

*Primary Examiner* — Jared Fureman
*Assistant Examiner* — Christopher J Clark
(74) *Attorney, Agent, or Firm* — John R. Pessetto; Frank D. Cimino

(57) ABSTRACT

An apparatus includes: an input configured to receive an input voltage; a prediction circuit coupled to the input and configured to provide an overcurrent prediction based on analysis of the input voltage; a delay circuit coupled to the input; a gain control circuit coupled to an output of the delay circuit and configured to selectively adjust a gain applied to at least one frequency range of the input voltage based on the overcurrent prediction; a driver coupled to an output of the gain control circuit; and a capacitive load coupled to an output of the driver.

20 Claims, 11 Drawing Sheets

CONTROL CIRCUIT WITH OVERCURRENT PREDICTION TO DRIVE CAPACITIVE LOAD

BACKGROUND

The proliferation of electronic devices and integrated circuit (IC) technology has resulted in the commercialization of IC products. As new electronic devices are developed and IC technology advances, new IC products are commercialized. One example IC product that is needed in electronic devices is a current limiter for capacitive loads. Piezo speakers are an example of a capacitive load.

Piezo speakers, with their lighter and thinner advantages, are starting to be adopted into devices such as televisions and computers. The capacitive load characteristics (impedance as a function of frequency curve) of a piezo speaker results in the impedance rapidly dropping at high frequencies (>10 KHz). Considering the output LC filter resonance effects of a Class-D amplifier, a piezo speaker plus Class-D amplifier combination may trigger an overcurrent condition at higher frequencies. Also, a capacitive load will introduce pole points, which may lead to unstable of a Class-D amplifier. To resolve these overcurrent and stability issues, some piezo speaker applications (e.g., television) will add a series power resistor (~2-10 ohm). This series power resistor has several disadvantages including power loss (low efficiency), heat dissipation (possibly affecting a display or other electronics), cost, and size.

SUMMARY

In accordance with an example embodiment of the disclosure, an apparatus comprises an input configured to receive an input voltage. The apparatus also includes an prediction circuit coupled to the input and configured to provide an overcurrent prediction based on analysis of the input voltage. The apparatus also includes a delay circuit coupled to the input. The apparatus also includes a gain control circuit coupled to an output of the delay circuit, wherein the gain control circuit is configured to selectively adjust a gain applied to at least one frequency range of the input voltage based on the overcurrent prediction. The apparatus also includes a driver coupled to an output of the gain control circuit. The apparatus also includes a capacitive load coupled to an output of the driver.

In accordance with an example embodiment of the disclosure, an integrated circuit comprises an input configured to receive an input voltage. The integrated circuit also comprises a control circuit coupled to the input and configured to: delay the input voltage; provide an overcurrent prediction while the input voltage is delayed, in which the overcurrent prediction is based on analysis of the input voltage and an impedance network profile; select a gain for at least one frequency range of the input voltage based on the overcurrent prediction; and output a drive voltage to a capacitive load based on the selected gain.

In accordance with an example embodiment of the disclosure, a method comprises delaying an input voltage. The method also comprises providing an overcurrent prediction while the input voltage is delayed, where the overcurrent prediction is based on analysis of the input voltage and a capacitive load profile. The method also comprises selecting a gain for at least one frequency range of the input voltage based on the overcurrent prediction, and outputting a drive voltage to a capacitive load based on the selected gain.

BRIEF DESCRIPTION OF THE DRAWINGS

For a detailed description of various examples, reference will now be made to the accompanying drawings in which.

DETAILED DESCRIPTION

Disclosed herein is a control circuit for a capacitive load (i.e., the impedance of the load decreases as the frequency of the input signal or voltage to the load increases). In some example embodiments, the capacitive load is a piezo speaker, and the control circuit is part of an integrated circuit (IC), multi-die module (MDM), multi-chip module, or other circuit product used to drive the piezo speaker. In one example embodiment, the control circuit delays the input audio signal (voltage) to the piezo speaker. During the delay, the control circuit analyzes the frequency content of the input audio signal (voltage) to determine an overcurrent prediction. Based on the overcurrent prediction, the control circuit selects the gains applied to different frequency ranges of the input audio signal (voltage). More specifically, the gains applied to different frequency ranges of the input audio signal (voltage) are selected to avoid an overcurrent condition. In one example, the gain applied to higher frequency content of the input audio signal (voltage) may be selected to avoid an overcurrent condition. At the same time, the control circuit operates to avoid interference with frequencies below a threshold frequency and/or operates to maximize the input audio signal (voltage) to the piezo speaker (e.g., in accordance with a predetermined sound quality metric) without triggering an overcurrent condition.

In some example embodiments, the overcurrent prediction operations of the control circuit involve a digital signal processor (DSP) configured to provide an impedance network profile. In one example, the impedance network profile is based on a model that includes an inductor-capacitor (LC) circuit and a piezo speaker modeled as a capacitor. With the impedance network profile, the DSP is able to predict the current draw of a piezo speaker based on the frequency content of an input audio signal (voltage) and the output voltage (Vout) to the piezo speaker. As needed, the control circuit is able to adjust the gains applied to different frequencies of the input audio signal (voltage) and/or to adjust Vout to avoid an overcurrent condition. In some example embodiments, one or more parameters of the impedance network profile applied by the DSP can be adjusted using a graphical user interface (GUI). In this manner, different piezo speaker scenarios (e.g., televisions/monitors with different sound capabilities) can be accommodated using the proposed control circuit. To provide a better understanding, various control circuit options and related capacitive load systems or scenarios are described using the figures as follows. Also, conventional electromagnetic speaker and piezo speaker scenarios are described for context.

Figure 1:
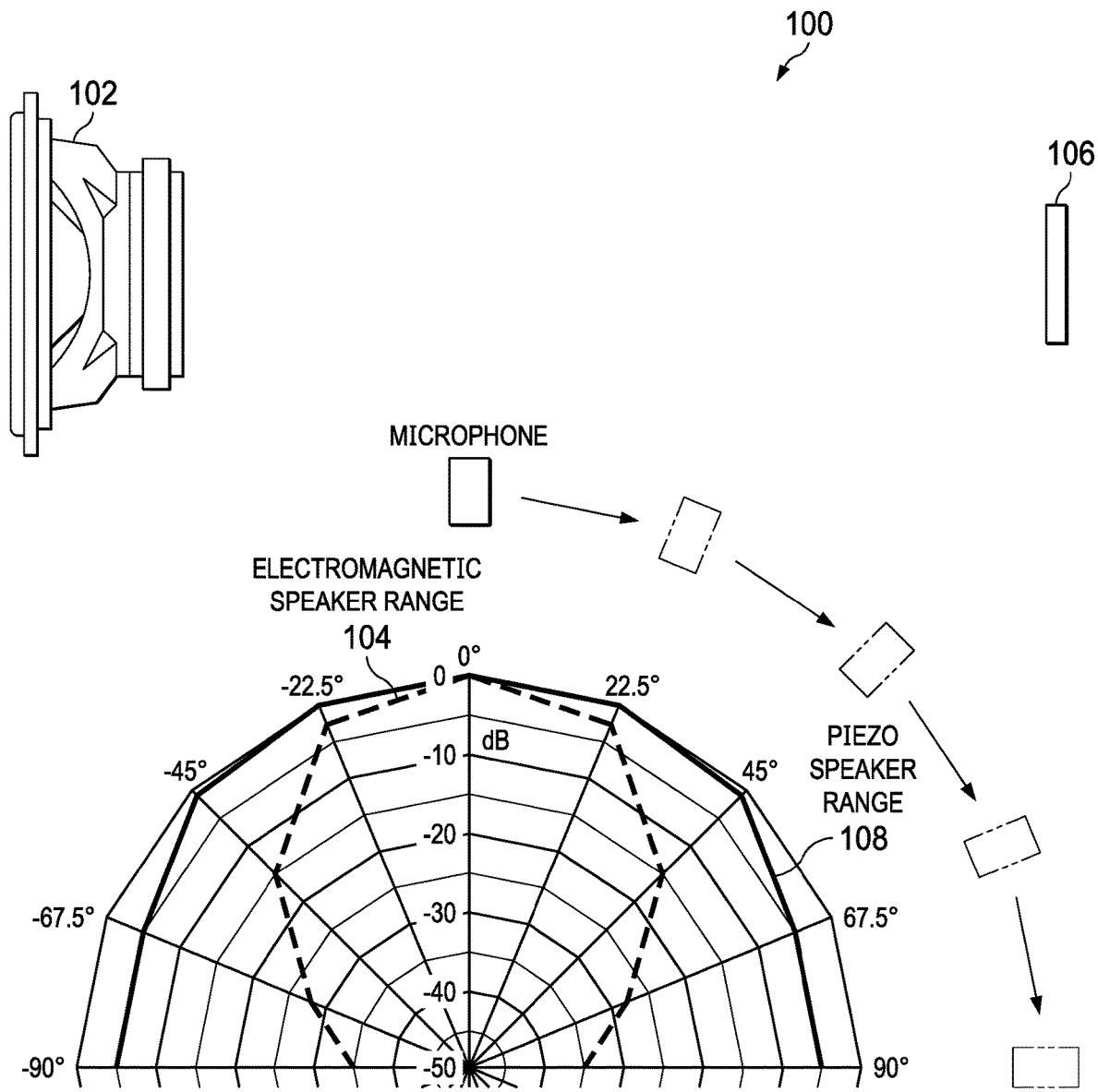
FIG. 1 is a graph showing an electromagnetic speaker range and a piezo speaker range.

FIG. 1 is a graph 100 showing an electromagnetic speaker range 104 and a piezo speaker range 108. As shown in graph 100, electromagnetic speakers 102 are larger in size and the respective range 104 is less than the range 108 of piezo speakers 106. Because of the size reduction and improved range of piezo speakers 106 relative to electromagnetic speakers 102, they are being used more in applications such as television or computer monitors. However, there are still ongoing issues such as relative cost and current draw management.

Figure 2A:
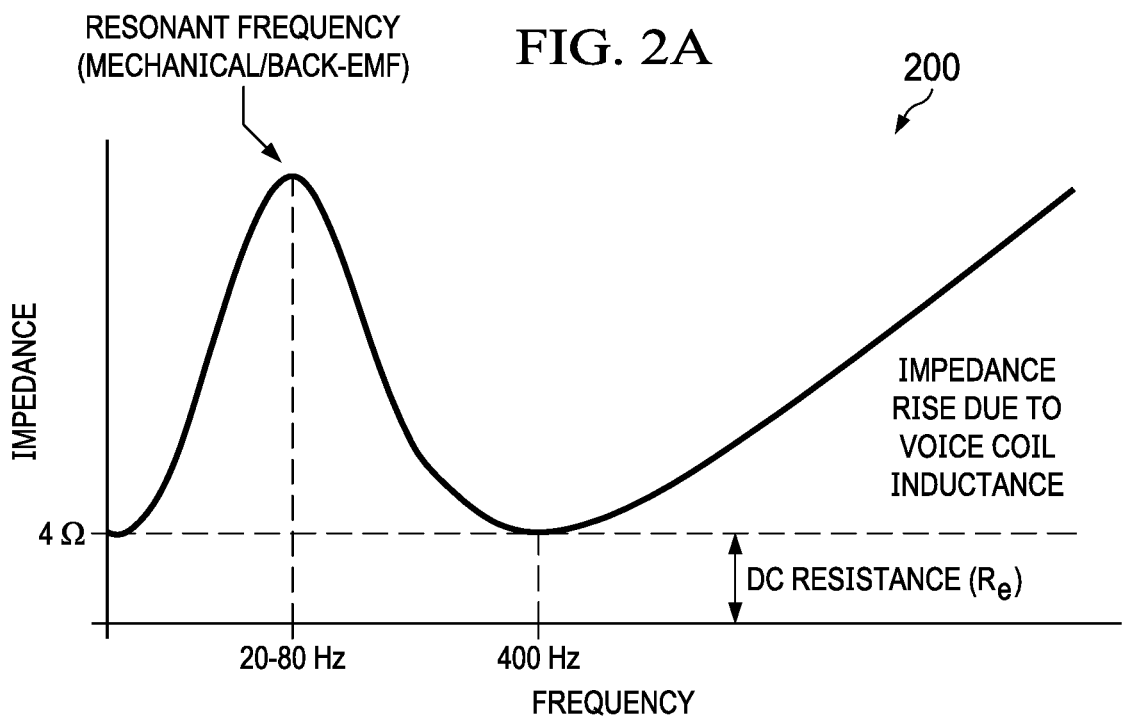
FIG. 2A is a graph showing impedance as a function of frequency for an electromagnetic speaker.

FIG. 2A is a graph 200 showing impedance as a function of frequency for an electromagnetic speaker. As shown in graph 200, the impedance has a minimum set by the DC resistance ($R_e$) of the electromagnetic speaker. The impedance rises to a peak at the resonant frequency (e.g., 20-80 Hz) and also rises at higher frequencies due to voice coil inductance.

Figure 2B:
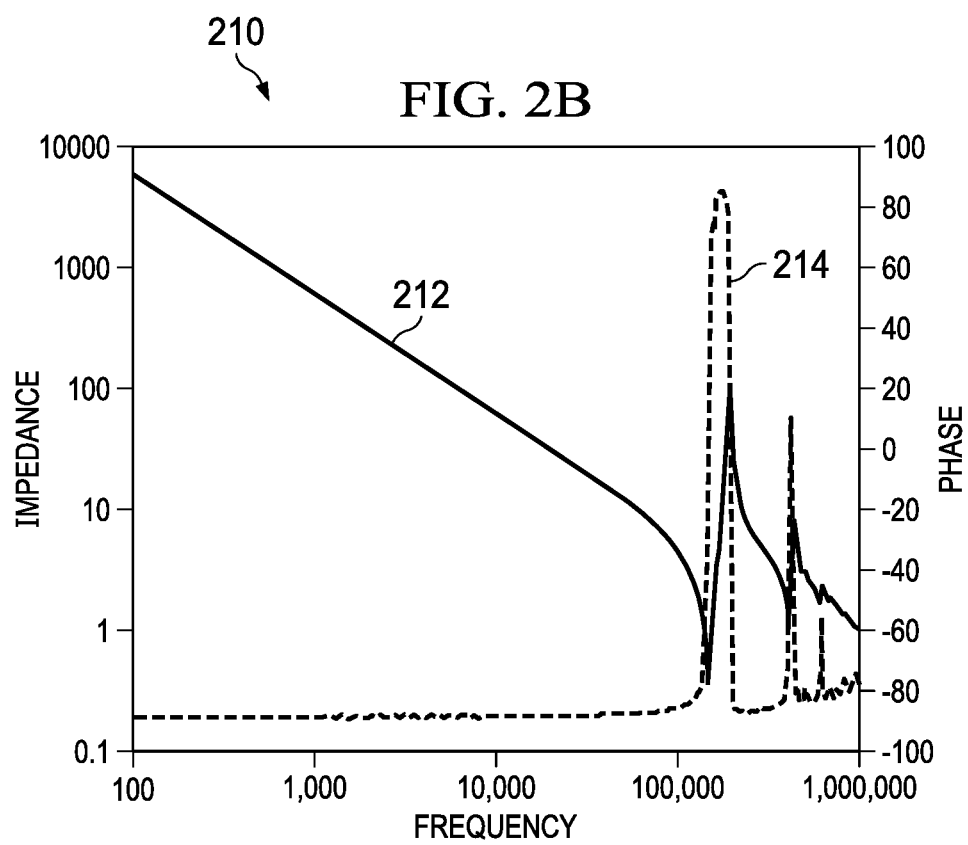
FIG. 2B is a graph showing impedance as a function of frequency for a piezo speaker.

FIG. 2B is a graph 210 showing impedance as a function of frequency for a piezo speaker. As shown in graph 210, the impedance curve for a piezo speaker falls as the frequency increases as represented by the solid line, which results in higher current consumption. Also, the phase curve for a piezo speaker increases above frequencies of 100 kHz as represented by the dashed line. Since the frequency range for an audio application is 20 Hz to 22 kHz, the higher frequency values (e.g., above 100 kHz) can be ignored in some example embodiments as these values will not be used for audio processing.

Figure 3A:
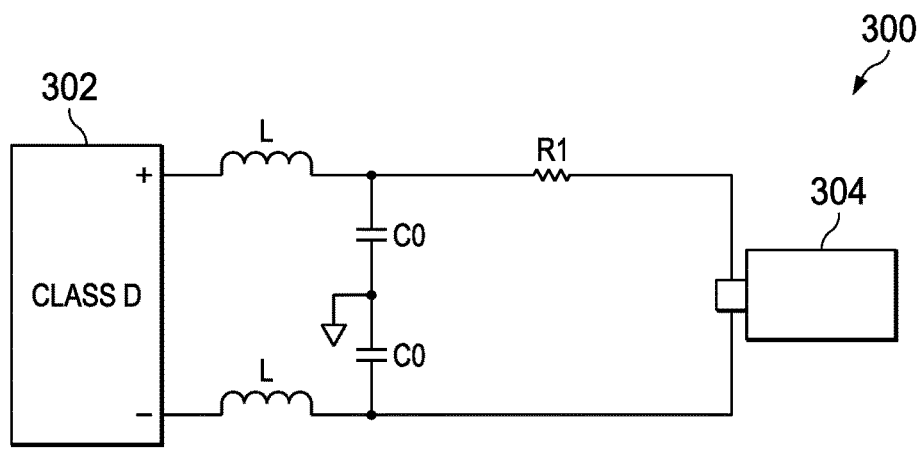
FIG. 3A is a diagram showing an audio system with a piezo speaker in accordance with a first conventional circuit.

FIG. 3A is a diagram showing an audio system 300 with a piezo speaker 304 in accordance with a first conventional circuit. As shown, the audio system 300 includes a Class-D driver circuit 302 with a positive supply node (labeled "+") and a negative supply node (labeled "–"). In the example of FIG. 3A, a first inductor-capacitor (LC) circuit with L (e.g., 10 uH) and C0 (e.g., 0.68 uF) is coupled between the positive supply node and a ground node. Also, a second LC circuit with L and C0 is coupled between the negative supply node and the ground node. As shown, a resistor (R1) is used in the audio system 300, where a first end of R1 (e.g., 4.7 ohms) is coupled between L and C0 of the first LC circuit. The second end of R1 is coupled to the piezo speaker 304 such that R1 and the piezo speaker 304 are in series. With R1, the impedance profile of the piezo speaker 304 does not result in an overcurrent condition because R1 adds impedance at all frequencies. However, use of R1 is undesirable as it increases heat dissipation (heating other nearby electronics), consumes power, negatively affects sound quality, and is a large component that increases the difficulty of accommodating R1 and other electronics within the housing of the end product (e.g., a television or computer monitor).

Figure 3B:
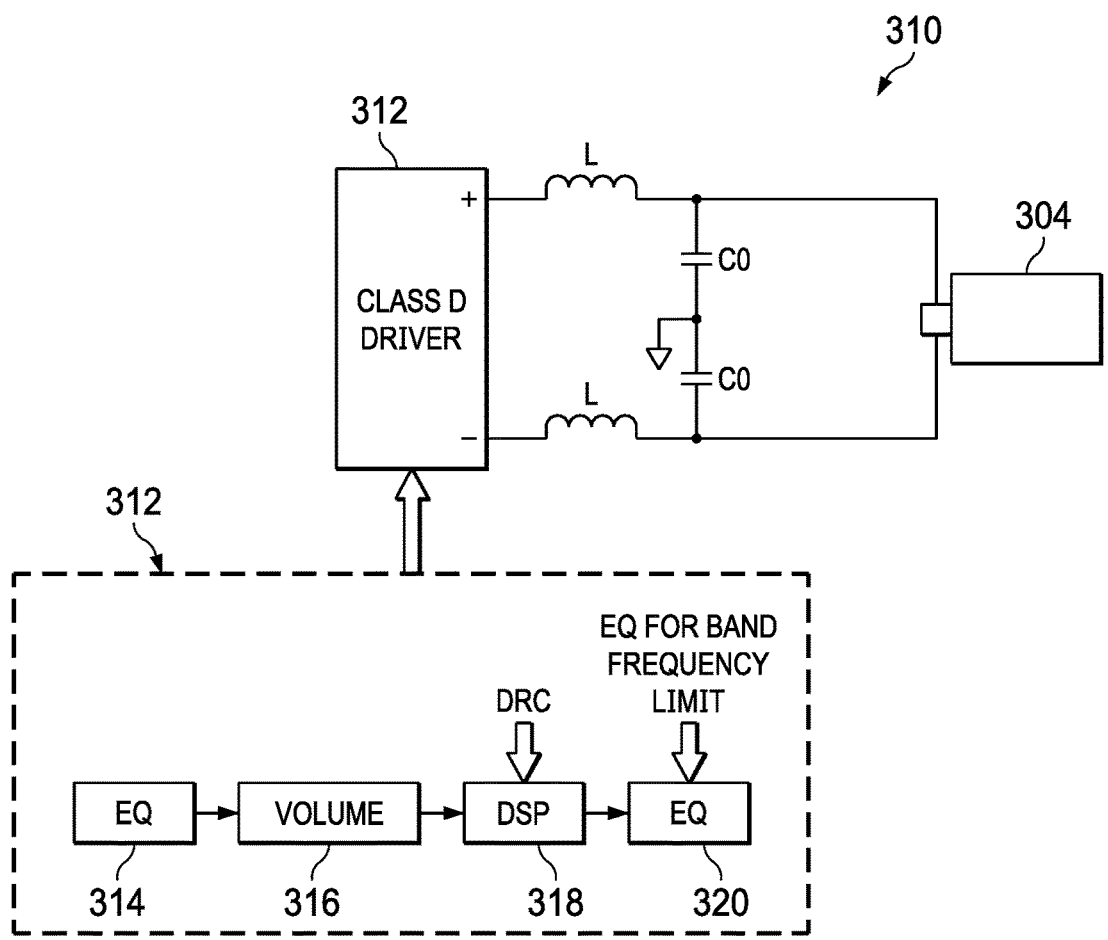
FIG. 3B is a diagram showing another audio system with a piezo speaker in accordance with a second conventional circuit.

FIG. 3B is a diagram showing another audio system 310 with a piezo speaker in accordance with a second conventional circuit. As shown, the audio system 310 includes the first and second LC circuits and the piezo speaker 304 described in FIG. 3A. Instead of using R1 to limit current to the piezo speaker 304 as in the audio system 300 of FIG. 3A, the audio system 310 of FIG. 3B uses features of the Class-D driver circuit 312 to limit current to the piezo speaker 304. As shown, the Class-D driver circuit 312 includes a first equalization block 314, a volume block 316, and a digital signal processor (DSP) 318 with dynamic range compression (DRC), and a second equalization block 320. In the example of FIG. 3B, the equalization parameters are adjusted to limit the band frequency of the audio signal (voltage), which limits the current to the piezo speaker 304.

With the band frequency limits of the audio system 310 in FIG. 3B, there is potential for more efficiency since R1 is omitted. However, there is also potential for instability. Also, the band frequency limits of the audio system 310 affects all audio levels, which decreases the sound quality. Also, the band frequency limits of the audio system 310 is not easily adjusted and does not eliminate overcurrent risk when an audio signal (voltage) includes several frequency harmonics (multi-tone).

Figure 4A:
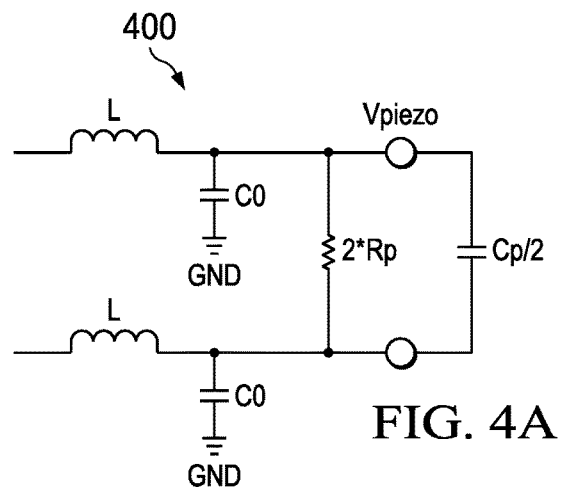
FIG. 4A is a schematic diagram showing an impedance network model in accordance with an example embodiment.

FIG. 4A is a schematic diagram showing an impedance network model 400 in accordance with an example embodiment. As shown, the model 400 includes the first and second LC circuits described in FIGS. 3A and 3B. The model 400 also includes a piezo speaker represented as a capacitive load (Cp/2). The model 400 also includes a resistive load (2*Rp) in parallel with the piezo speaker. In some example embodiments, the impedance of the model 400 is used as the impedance network profile used by the proposed control circuit to predict overcurrent condition and make adjustments as needed. With the impedance network model 400, the current through the inductor and the Vout to the piezo speaker 304 can be estimated and used to predict an overcurrent condition. Example adjustments to avoid an overcurrent condition include frequency-dependent gain adjustments and Vout adjustments.

Figure 4C:
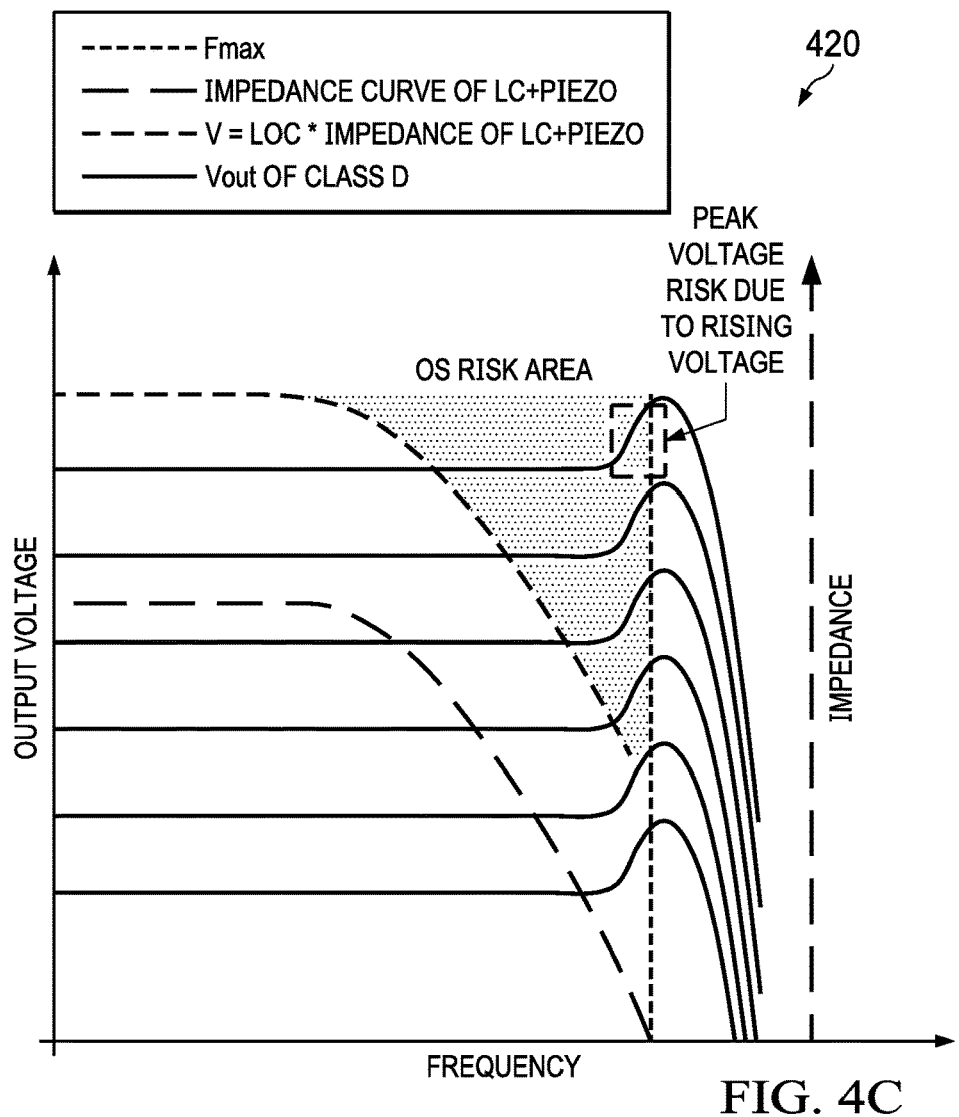
FIG. 4C is a graph showing output voltage of a Class-D driver circuit as a function of piezo speaker frequency.
Figure 4B:
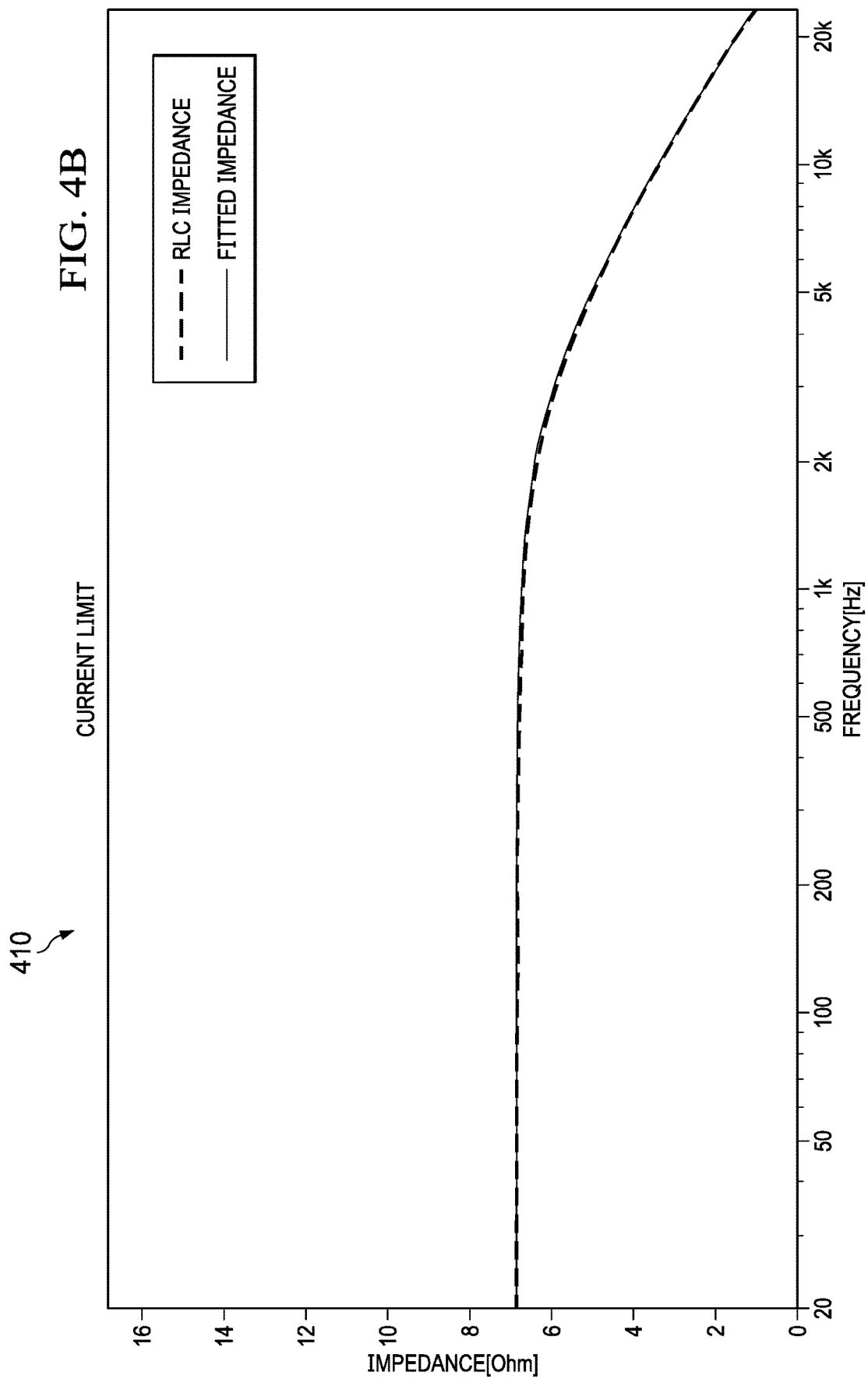
FIG. 4B is a graph showing impedance as a function of frequency for the impedance network model of FIG. 4A.

FIG. 4B is a graph 410 showing impedance as a function of frequency for the model 400 of FIG. 4A. As shown, the impedance of the model 400 falls as the frequency increases. In some example embodiments, fitting of an impedance curve to the impedance of the model 400 is performed to limit current to a piezo speaker. In some example embodiments, an impedance curve such as the one represented in graph 410 is fit by the proposed control circuit. The impedance curve can be used to estimate current draw by a piezo speaker and to identify a risky overcurrent area as a function of voltage and frequency.

For example, FIG. 4C is a graph 420 showing output voltage of a Class-D driver circuit as a function of piezo speaker frequency. In graph 420, the impedance curve of the model 400 is used to define an overcurrent risk area that is a function of output voltage and frequency. By monitoring the frequency content of an input audio signal (voltage) and adjusting the output voltage as needed, an overcurrent risk area can be avoided. In some example embodiments, the proposed control circuit will monitor a high-frequency content of an input audio signal (voltage) using a sample delay buffer (e.g., a 128-sample or 2.67 ms delay buffer). If an overcurrent or overvoltage condition is estimated to be triggered, the proposed control circuit will reduce the gain applied to the high-frequency content and/or reduce Vout to the piezo speaker to avoid the overcurrent risk.

Figure 5A:
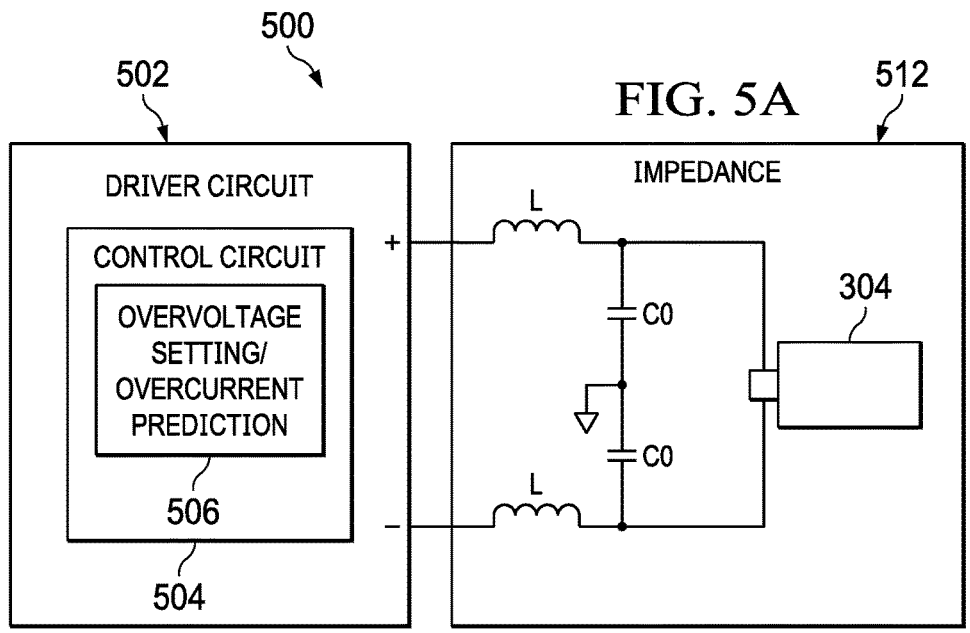
FIG. 5A is a diagram showing an audio system with an impedance network in accordance with an example embodiment.

FIG. 5A is a diagram showing an audio system 500 with an impedance network 512 in accordance with an example embodiment. In the audio system 500, the impedance network 512 includes the first and second LC circuits and the piezo speaker 304 described in FIGS. 3A and 3B. As shown, the audio system 500 of FIG. 5 includes a driver circuit 502 configured to provide an output voltage (Vout) to the impedance network 512 based on a control circuit 504 with an overvoltage setting/overcurrent prediction algorithm 506. With the control circuit 504, Vout is adjusted to account for the frequency content of the input audio signal (voltage) such that overvoltage and overcurrent events are avoided.

In some example embodiments, the operations of the control circuit 504 are based on current modeling and estimation in the full audio band. The overvoltage setting/overcurrent prediction algorithm 506 employed by the control circuit 504 can be described as an adaptive look-ahead current limit algorithm to prevent overvoltage and overcurrent conditions in a piezo speaker application. More specifically, in some example embodiments, the operations of the control circuit 504 are based on current estimation modeling, accuracy peak current detection, piezo impedance curve fitting, a look ahead delay buffer, current and voltage gain control, and gain smooth and decay control. In some example embodiments, the control circuit 504 uses LC filter and piezo speaker modeling (e.g., the impedance network model 400 for accurate peak current detection and impedance curve fitting). Also, the control circuit 504 accounts for sound quality targets by use of adaptive gain control, which mainly affects high-frequency content. For mid-frequency and low-frequency content, independent adjustment are possible to minimize the impact of current limit operations to piezo speaker sound quality. With the audio system 500, a series resistor (see e.g., R1 in FIG. 3A) is avoided, which reduces costs and the circuit footprint. Also, the driver circuit 502 with the control circuit 504 provides a stable solution that can avoid overvoltage and overcurrent conditions for the piezo speaker 304 without affecting all audio levels. Also, the driver circuit 502 with the control circuit 504 is adjustable for different impedance networks and is effective for input audio signals (voltages) with several frequency harmonics (multi-tone).

Figure 5B:
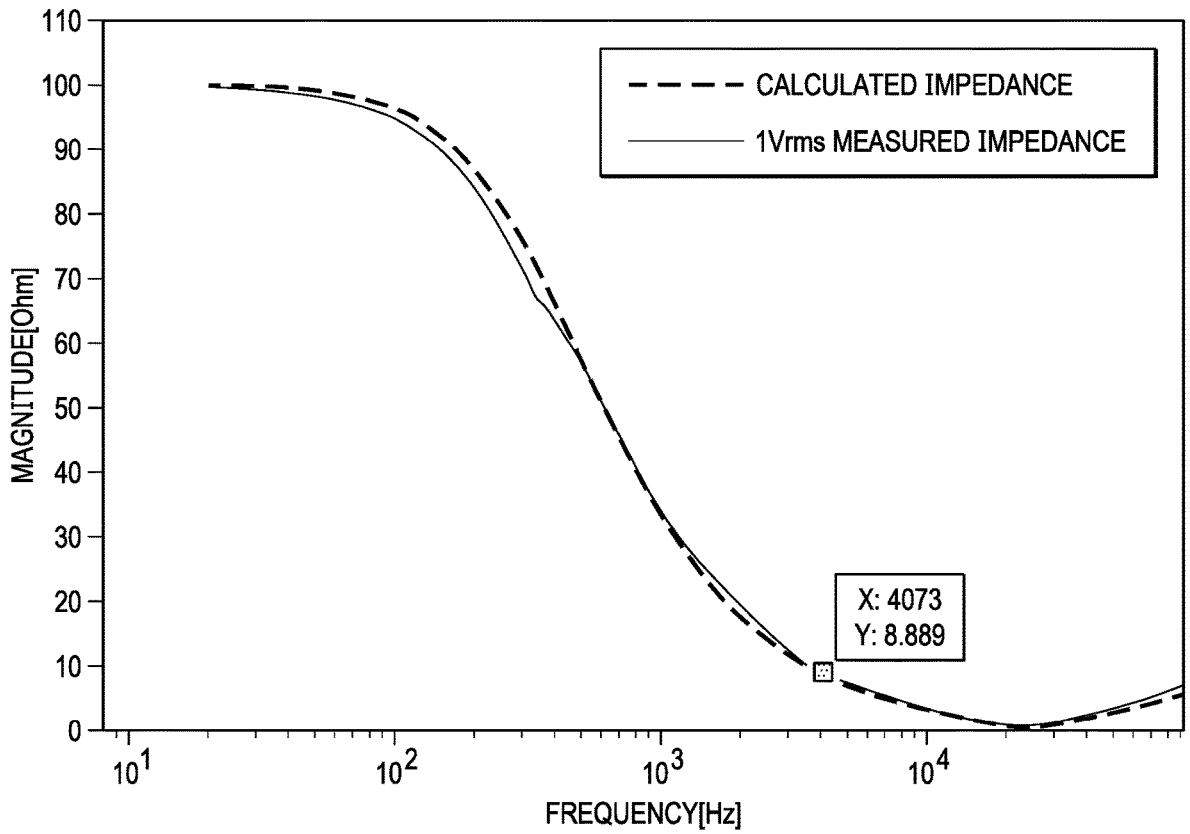
FIG. 5B is a graph showing a piezo speaker profile in accordance with an example embodiment.

FIG. 5B is a graph 510 showing a piezo speaker profile (impedance as a function of frequency) in accordance with an example embodiment. In the graph 510, the piezo speaker profile corresponds to a calculated impedance as a function of frequency, which is represented along with a measured impedance as a function of frequency. As shown, the calculated impedance closely matches the measured impedance, which is an indication that a curve fitting algorithm (e.g., implemented using a DSP of the proposed control circuit) is able to provide a piezo speaker profile that will effectively predict overcurrent conditions from frequency content of an input audio signal (voltage) and Vout to the piezo speaker. Based on the predicted overcurrent conditions, a piezo speaker driver can adjust frequency-dependent gains and/or Vout to avoid the overcurrent conditions.

Figure 6A:
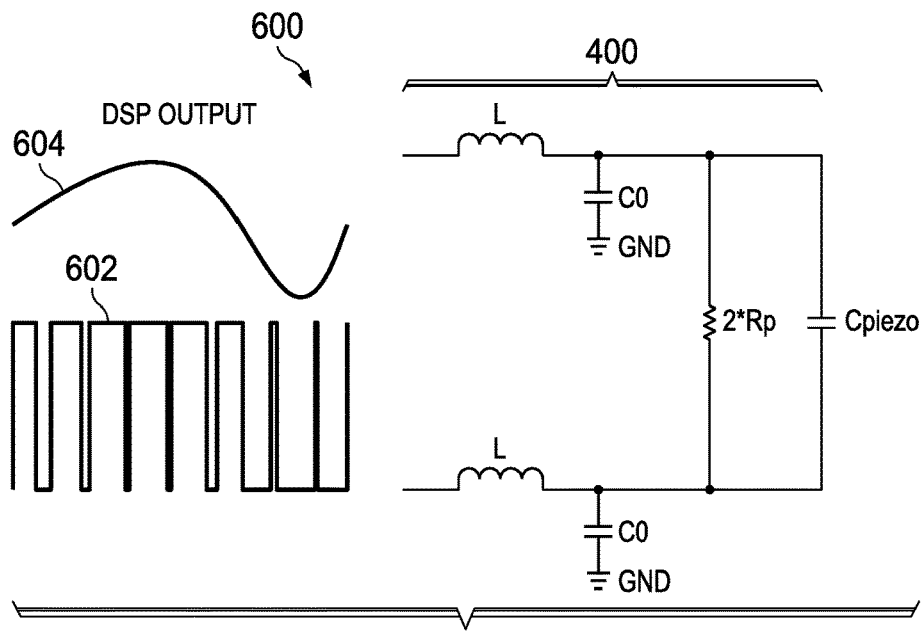
FIG. 6A is a diagram showing the impedance network model of FIG. 4A along with digital signal processor (DSP) signals in accordance with an example embodiment.

FIG. 6A is a diagram 600 showing the impedance network model 400 of FIG. 4A along with a DSP signal in accordance with an example embodiment. In the diagram 600, the DSP output is a pulse width modulation (PWM) waveform 602 modulated from an audio signal (voltage) 604. In the example of FIG. 6A, the PWM waveform 602 can be analyzed in two ways. The first way involves filtering out the audio signal (voltage) 604 (after LC filtering) to obtain the differential equivalent circuit of FIG. 6B, leading to I_diff. The second way involves the PWM waveform 602 working directly on the LC filter to obtain the common equivalent circuit of FIG. 2C, leading to I_com.

Figure 6B:
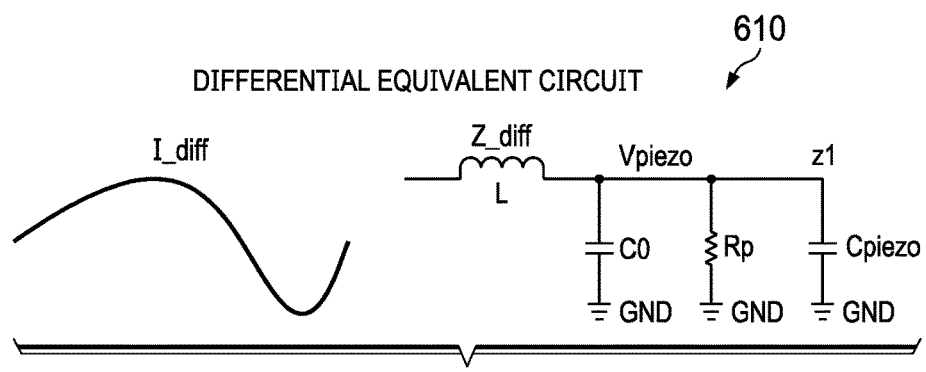
FIG. 6B is a diagram showing a differential equivalent circuit relative to the impedance network model of FIG. 6A.
Figure 6C:
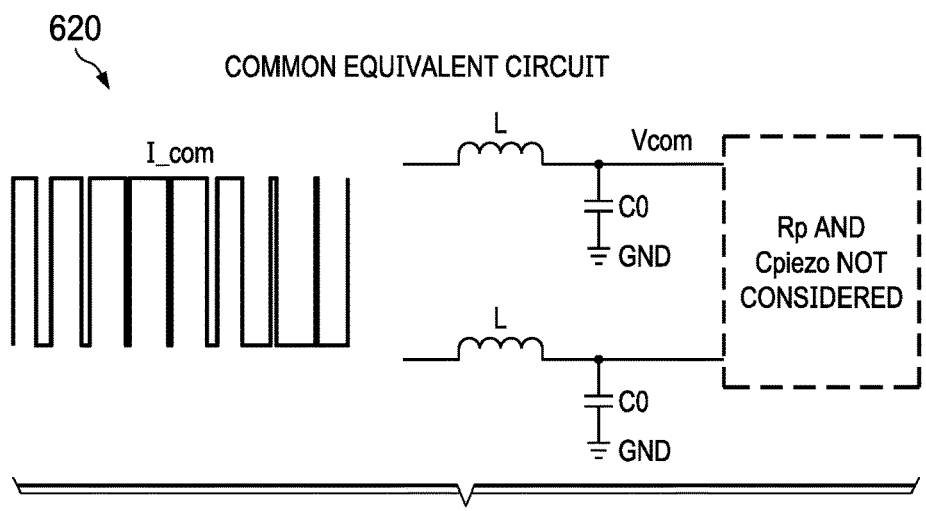
FIG. 6C is a diagram showing a common equivalent circuit relative to the impedance network model of FIG. 6A.

As previously discussed, the impedance network model 400 includes an arrangement of inductors and capacitors, a capacitor (Cpiezo) and a parallel resistor representing the piezo speaker. FIG. 6B is a diagram 610 showing a differential equivalent circuit relative to the impedance network model 400. In FIG. 4B, Z_diff corresponds to the impedance of the impedance network as seen from the inductor, V_piezo is the voltage provided to Cpiezo, and z1 is the impedance of Cpiezo. FIG. 6C is a diagram 620 showing a common equivalent circuit relative to the impedance network model 400. In FIG. 6C, I_com is the common current in the impedance network and Vcom is the common voltage provided to Cpiezo.

In at least some example embodiments, the proposed control circuit performs current modeling based on:

$$Z\_\text{diff}=i*w*L+Rp/(1+i*w*Rp*(C0+C\text{piezo}));$$

$$I\_\text{diff}=V\text{in}/Z\_\text{diff};$$

$$I\_\text{com}=1/L*\text{duty}*\sin(\text{phase}i)*T\text{pwm}*(\text{PVDD}-V\text{com});$$
and $$I\_\text{total}=I\_\text{diff}+I\_\text{com},$$

where i is the imaginary unit, w is 2*pi*frequency, Vin is the output of a class D amplifier and the input to the impedance network model 400, phasei is the phase of the current and voltage, Tpwm is the period of the PWM waveform 602, PVDD is the power supply voltage for the class D amplifier, and I_total is the total current through the inductor. Also, in at least some example embodiments, the proposed control circuit performs voltage modeling based on:

$$z1=Rp/(1+i*w*Rp*(C0+C\text{piezo}));$$

$$G0=z1/z\_\text{diff}$$

$$V\text{piezo}=V\text{in}*G1,$$

where z1 is the total impedance of Rp and Cpiezo, C0 is the capacitor of LC filter, G0 is the gain of the LC filter, Vpiezo is the voltage provided to the piezo speaker, and G1 is the gain of Vpiezo/Vin. Such current modeling and voltage modeling operations enable the proposed control circuit to predict a piezo speaker overcurrent condition and make adjustments as described herein.

Figure 7:
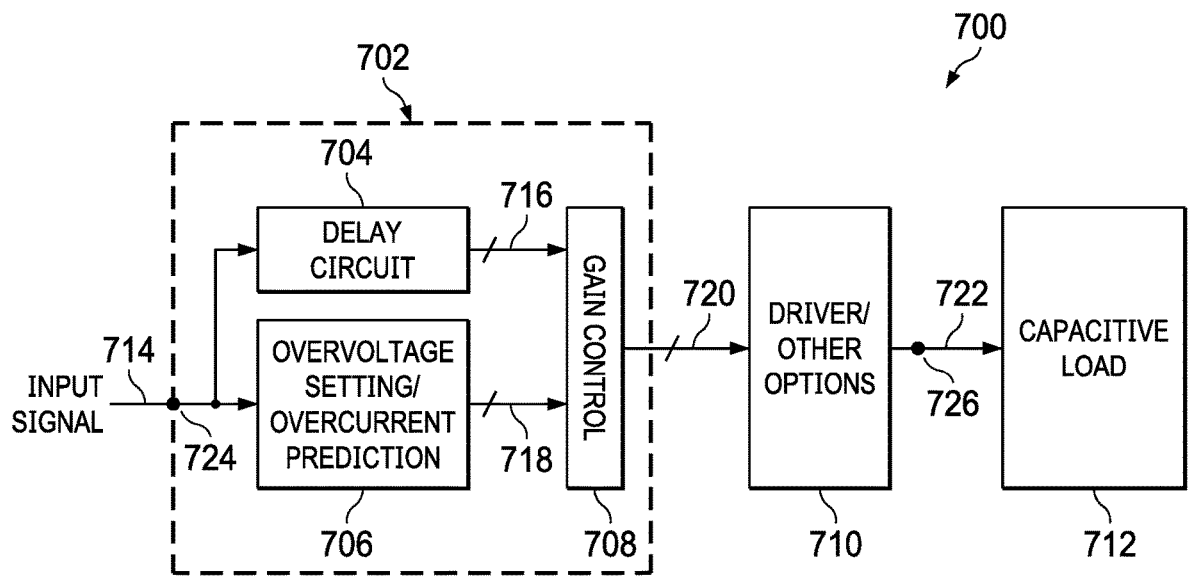
FIG. 7 is a block diagram showing a system in accordance with an example embodiment.

FIG. 7 is a block diagram showing a system 700 in accordance with an example embodiment. As shown, the system 700 includes a control circuit 702 (e.g., an example of the control circuit 504 in FIG. 5) with an input node 724 configured to receive an input signal (voltage) 714 (e.g., an input audio signal or voltage). In the example of FIG. 7, the control circuit 702 includes a delay circuit 704 coupled to the input node 724 and configured to output filtered content 716 of the input signal (voltage) 714. In an example embodiment, the filtered content 716 includes high-frequency content (at or above a threshold frequency) of the input signal (voltage) 714 and low-frequency content (below the threshold frequency) of the input signal (voltage) 714. The filtered content 716 is provided to a gain control circuit 708 of the control circuit 702.

As shown, the control circuit 702 also includes an overvoltage setting/overcurrent prediction circuit 706 (e.g., to provide the overvoltage setting/overcurrent prediction algorithm 506 in FIG. 5) coupled to the input node 724, where the overvoltage setting/overcurrent prediction circuit 706 is configured to predict an overcurrent condition for the capacitive load 712 based on an adjustable overvoltage setting and analysis of the input signal (voltage) 714 and an impedance network profile (e.g., the impedance network model 400). In an example embodiment, the overvoltage setting/overcurrent prediction circuit 706 analyzes filtered content of the input signal (voltage) 714, such as high-frequency content (at or above a threshold frequency determined by the capacitive load profile) and low-frequency content (below the threshold frequency determine by the capacitive load profile). If the amount of high-frequency content is greater than a predetermined amount, the overvoltage setting/overcurrent prediction circuit 706 predicts an overcurrent condition will occur and indicates this positive prediction using prediction signal(s) 118. Otherwise, the overvoltage setting/overcurrent prediction circuit 706 predicts that no overcurrent condition will occur and indicates this negative prediction using prediction signal(s) 718. In different embodiments, the prediction signal(s) 718 indicates an overcurrent prediction, an amount of overcurrent predicted, an amount of current predicted (whether an overcurrent is predicted or not), an amount of current attributable to each of a plurality of frequency ranges of the input signal (voltage) 714, and/or other factors.

The gain control circuit 708 uses the prediction signal(s) 718 to adjust the gains applied to the filtered content 716 of the input signal (voltage) 714. As needed, the gain applied to the high-frequency content of the input signal (voltage) 714 is reduced to avoid an overcurrent condition. Also, the gains applied by the gain control circuit 708 may be adjusted to achieve a target sound quality for one or more frequency ranges of the input signal (voltage) 714. In some example embodiments, the control signals 720 output from the gain control circuit 708 are used by a driver/other options circuit 710 to generate a drive signal (voltage) 722, which is provided to an output node 726 coupled to a capacitive load 712 (e.g., a piezo speaker). In some example embodiments, the driver/other options circuit 710 include driver components as well as equalizer and/or automatic gain leveler (AGL) components. With the overcurrent prediction operations of the control circuit 702, the amount of current provided to the capacitive load 712 using the drive signal (voltage) 722 is limited as needed to avoid an overcurrent condition. At the same time, the frequency content of the drive signal (voltage) 722 is intended to match the frequency content of the input signal (voltage) 714 (some equalization options may be selected by a user) and/or the amount of current provided to the capacitive load 712 with the drive signal (voltage) 722 is intended to comply with a predetermined sound quality metric.

Figure 8:
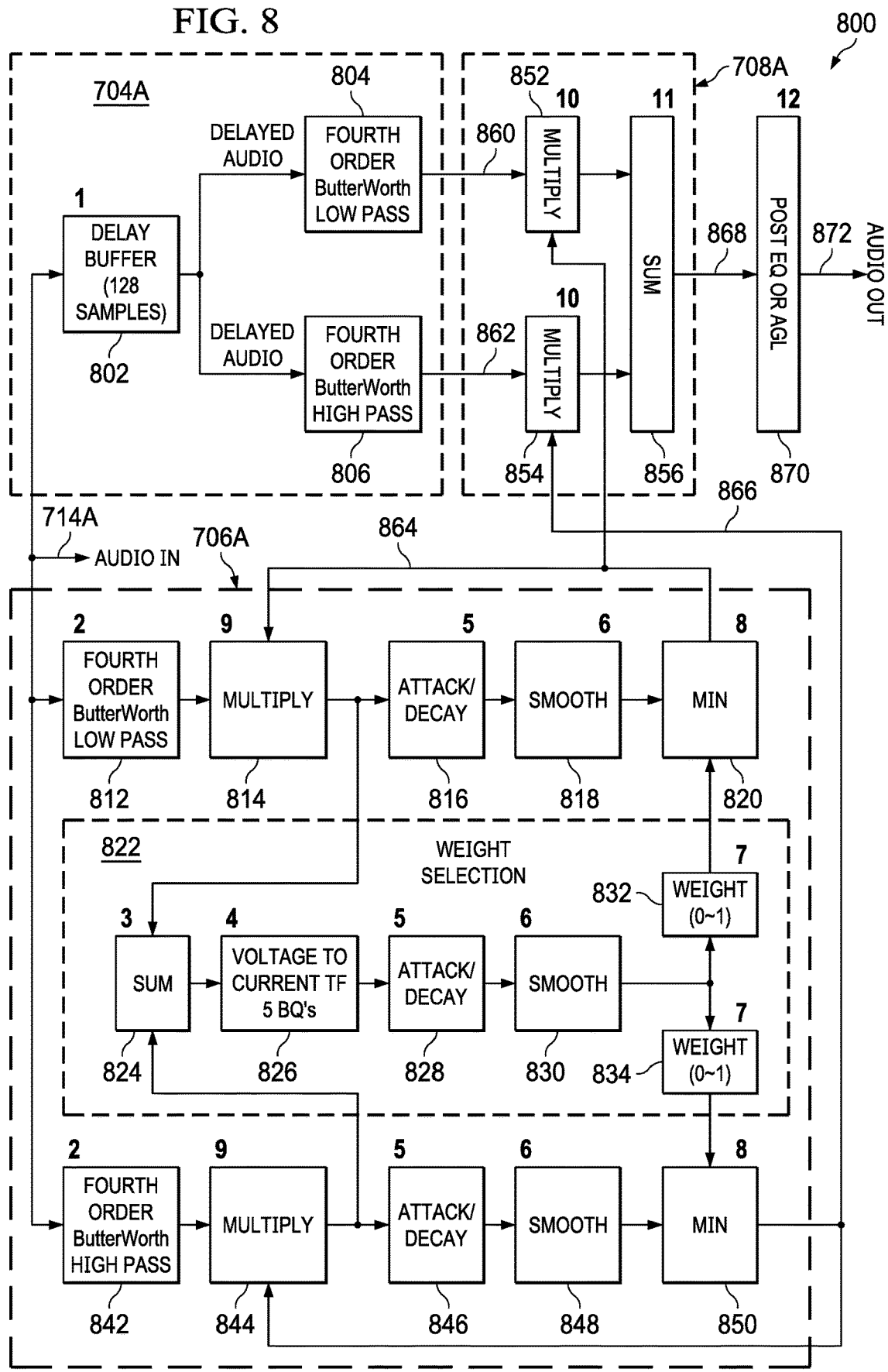
FIG. 8 is a block diagram showing a control circuit for an audio signal and piezo speaker in accordance with an example embodiment.

FIG. 8 is a block diagram showing a control circuit 800 (an example of the control circuit 504 in FIG. 5, or the control circuit 702 in FIG. 7) for an audio signal (voltage) and piezo speaker in accordance with an example embodiment. As shown, the control circuit 800 includes a delay circuit 704A (an example of the delay circuit 704 in FIG. 7), an overvoltage setting/overcurrent prediction circuit 706A (an example of the overvoltage setting/overcurrent prediction circuit 706 in FIG. 7), and a gain control circuit 708A (an example of the gain control circuit 708 in FIG. 7). In different example embodiments, the operations of the control circuit 800 are performed using hardware, software, or a combination of hardware and software. In one example embodiment, a DSP and related instructions are used to perform at least some of the operations of the control circuit 800.

In the example of FIG. 8, the delay circuit 702A includes a delay buffer 802 (e.g., 128 sample delay buffer), a low-pass filter 804 (e.g., a $4^{th}$ order Butterworth low-pass filter), and a high-pass filter 806 (e.g., a $4^{th}$ order Butterworth high-pass filter). The outputs of the delay circuit 702A include delayed low-frequency content 860 and delayed high-frequency content 862 based on the content of the input signal (voltage) 714A (an example of the input signal or voltage 714 in FIG. 7) provided to the delay circuit 702A.

The input signal (voltage) 714A is also provided to the overvoltage setting/overcurrent prediction circuit 706A, which includes a low-pass filter 812 (e.g., a $4^{th}$ order Butterworth low-pass filter) and a high-pass filter 842 (e.g., a $4^{th}$ order Butterworth high-pass filter). The output of the low-pass filter 812 is input to a feedback loop that includes a multiply block 814, an attack/decay block 816, a smooth block 818, and a minimum block 820. As shown, a first output signal 864 from the overvoltage setting/overcurrent prediction circuit 706A is provided from the minimum block 820 to the gain control circuit 708A. The first output signal 864 is also fed back to the multiply block 814. Similarly, the output of the high-pass filter 842 is input to a feedback loop that includes a multiply block 844, an attack/decay block 846, a smooth block 848, and a minimum block 850. As shown, a second output signal 866 from the overvoltage setting/overcurrent prediction circuit 706A is provided from the minimum block 850 to the gain control circuit 708A. The second output signal 866 is also fed back to the multiply block 844. The outputs of the multiply blocks 814 and 844 are also provided to a weight selection controller 822 that includes a summation block 824, a voltage-to-current transfer function block 826, an attack/decay block 828, a smooth block 830, a low-frequency weight block 832, and a high-frequency weight block 834. As needed, the output of the low-frequency weight block 832 is used to adjust at least one parameter of the minimum block 820, and the output of the high-frequency weight block 834 is used to adjust at least one parameter of the minimum block 850.

As shown, the gain control circuit 708A includes a first multiply block 852 to control the gain applied to delayed low-frequency content 860 based on the first output signal 864 from the overvoltage setting/overcurrent prediction circuit 706A. The gain control circuit 706A also includes a second multiply block 854 to control the gain applied to delayed high-frequency content 862 based on the second output signal 866 from the overvoltage setting/overcurrent prediction circuit 706A. The outputs of the multiply blocks 852 and 854 are provided to a summation block 856. The output of the summation block 856 is an output signal 868 from the gain control circuit 708A. In the example of FIG. 8, the output signal 868 (an example of the control signals 720 in FIG. 7) is provided to block 870 (an example of driver/other options circuit 710 in FIG. 7), which performs subsequent operations such as post equalization or AGL operations. The drive signal (voltage) 872 (an example of the drive signal 722 in FIG. 7) output from block 870 is provided to a capacitive load (e.g., a piezo speaker) as described herein.

In the example of FIG. 8, various blocks of the delay circuit 704A, the overvoltage setting/overcurrent prediction circuit 706A, and the gain control circuit 708A are represented with the bolded numbers 1-12 to show a sequence of steps for example algorithm employed by the control circuit 800. The steps 1-12 are intended to assist in understanding the example algorithm of FIG. 8, and are not intended to limit embodiments of the control circuit to particular components, or set/order of operations. In step 1, the delay buffer 802 will buffer the input audio data before it is output to a piezo speaker. During the buffer time, the algorithm performs steps 2-9. In step 2, the low-pass filter 812 and the high-pass filter 842 filter the input audio signal (voltage) 714A into low-frequency content and high-frequency content. In step 3, the full audio band audio signal (voltage) is recovered by the summation block 824 by adding the low-frequency content audio and high-frequency content together. Step 3 is performed in part because the current control works faster than the voltage control. At step 4, the voltage-to-current transfer function block 826 (e.g., 5 biquads or "BQs" corresponding to an infinite impulse response (IIR) filter) is used to perform fitting operations and predict current in a piezo speaker based on an impedance network profile. At step 5, gain control operations are performed using the attack/decay blocks 816, 828, 846. With I=V/R, the maximum output current is estimated and compared with a predetermined maximum allowed current value. If the estimated maximum output current exceeds the predetermine maximum allowed current value, the gain is decreased. Otherwise, the gain does not change. In some example embodiments, the step 5 involves comparing an output voltage to a predetermined maximum allowed output voltage. If the output voltage exceeds the maximum value, the gain is decreased. Otherwise, the gain does not change.

At step 6, the smooth blocks 818, 830, and 848 operate to smooth voltage and current gains to avoid sound defects. At step 7, the weight blocks 832 and 834 are used to adjust the gain weights for low-frequency content and high-frequency content. When overcurrent is predicted to occur, at least one of the gain adjustments is decreased. In one example embodiment, the gains for both the low-frequency content and the high-frequency content are decreased in response to an overcurrent prediction (e.g., the decrease in the gain for the high-frequency content is higher than the decrease in the gain for the low-frequency content to achieve a desired sound quality). At step 8, a minimum operation is performed by the minimum blocks 820 and 850 to ensure that independent voltage control and current control are met by the algorithm. At step 9, the multiply blocks 814 and 844 perform a feedback mechanism to ensure a stable and suitable gain is obtained after repeated operations of the voltage and current gain control algorithm. At step 10, the delay time expires and the multiply blocks 852 and 854 receive the delayed and filtered input signal (voltage) content. The multiply blocks 852 and 854 multiply the high-frequency content and the low-frequency content by the gain obtained from steps 2 to 9 to avoid overcurrent and overvoltage conditions. At step 11, the summation block 856 combines the adjusted high-frequency content and the adjusted low-frequency content to form full band audio content for output from the gain control circuit 708A. At step 12, the block 870 performs post equalization and AGL operations to further limit the voltage to the piezo speaker if needed.

Figure 9:
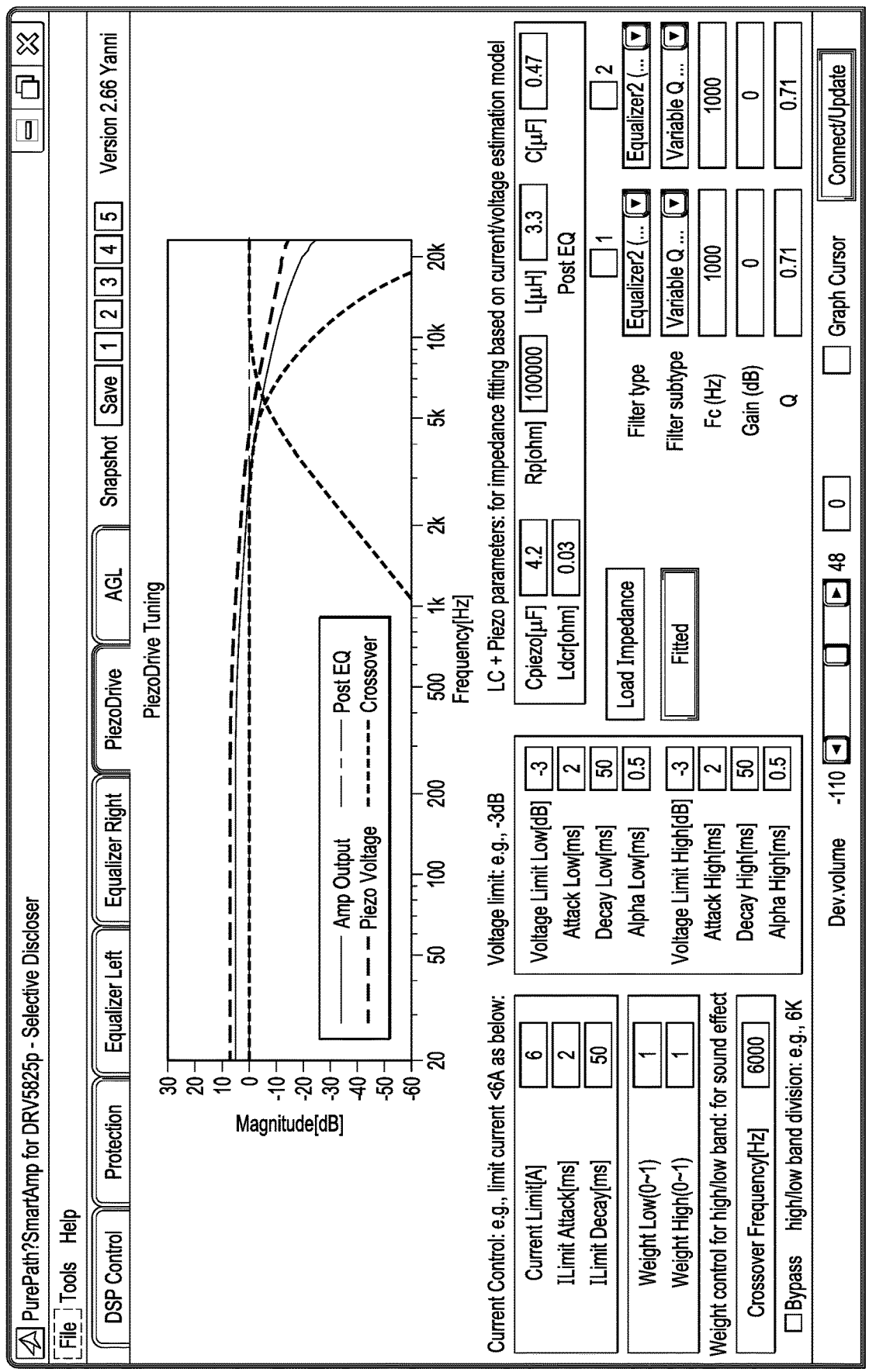
FIG. 9 is a screenshot of a graphic user interface (GUI) to adjust an impedance network profile in accordance with an example embodiment.

FIG. 9 is a screenshot 900 of a GUI to adjust an impedance network profile in accordance with an example embodiment. As shown in the screenshot 900, the values for Cpiezo, Rp, L, and C (C0 in impedance network model 400 and related equations) are adjustable, which enables changes to the fit of the impedance network profile used by the control circuit as described herein. In some example embodiments of the GUI, the value of Cpiezo is determined by user selection. Once Cpiezo is selected, values for L, C and Rp are recommended based on stability considerations and the current limiter algorithm. After all values are accepted using the GUI, the values are sent to the control circuit (e.g., a DSP) of a class D amplifier for use in the current limit algorithm.

Figure 10:
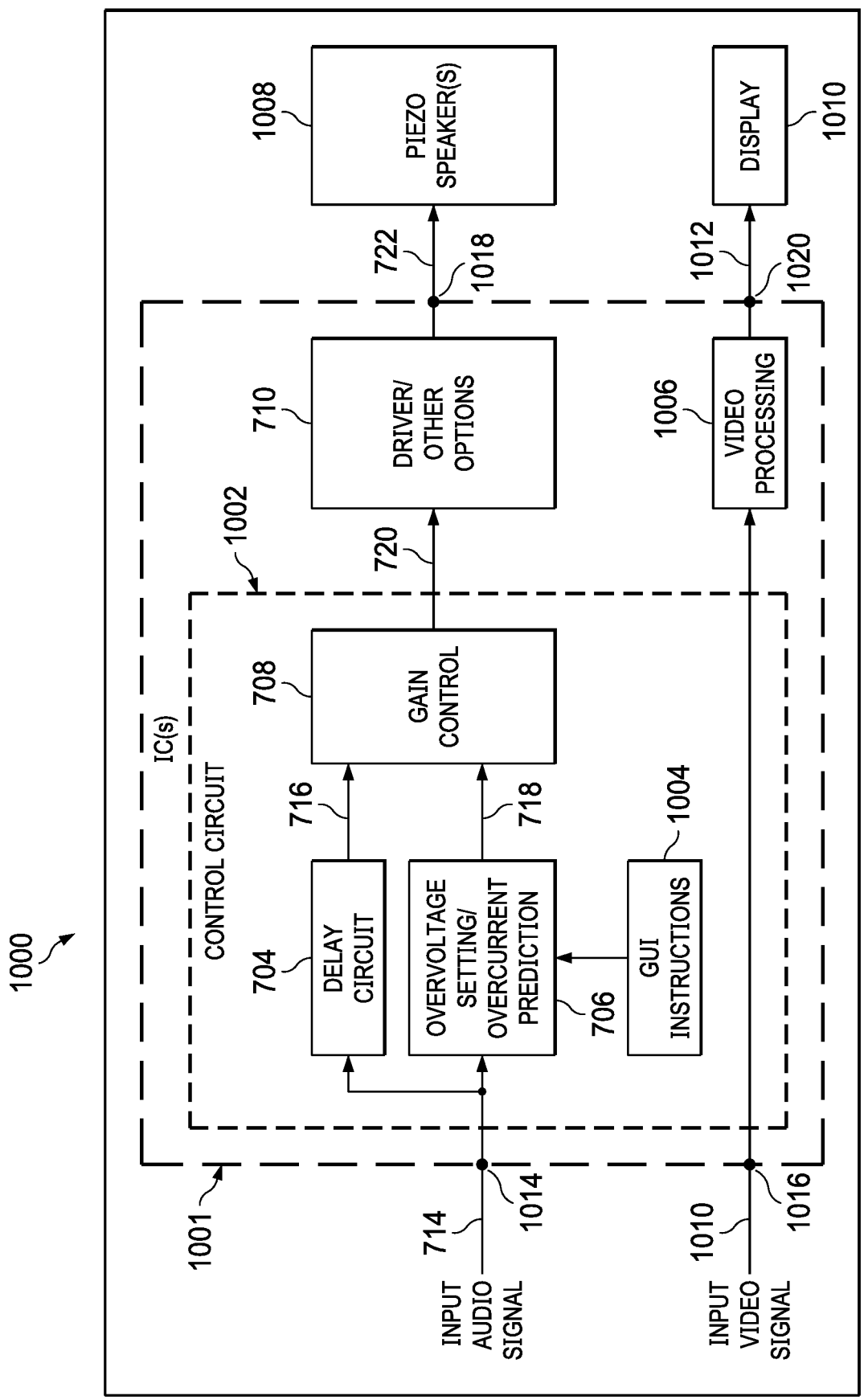
FIG. 10 is a block diagram showing a system in accordance with an example embodiment.

FIG. 10 is a block diagram showing a system 1000 in accordance with an example embodiment. The system 1000 is representative of an end product (e.g., a television or computer monitor) with a piezo speaker 1008 and one or more integrated circuits (ICs) 1001 that dynamically avoid an overvoltage and overcurrent condition for the piezo speaker as described herein. As shown, the IC(s) 1001 include a control circuit 1002 (e.g., an example of the control circuit 504 in FIG. 5, such as a DSP and/or other components) with the delay circuit 704, the overvoltage setting/overcurrent prediction circuit 706, the gain control circuit 708, and related signals (e.g., 714, 716, 718, 720). The control signal 720 output from the control circuit 1002 is provided to a driver/other options circuit 710 included with the IC(s) 1001. In the example of FIG. 10, the control circuit 1002 also includes GUI instructions 1004 to support adjustments to an impedance network profile as described herein (see e.g., the screenshot 900 of FIG. 9). The IC(s) 1001 also includes a video processing block 1006 configured to process an input video signal 1010. In the example of FIG. 10, the input nodes for the IC(s) 1001 include an audio input node 1014 and a video input node 1016. Also, the output nodes for the IC(s) 1001 include an audio output node 1018 (e.g., to output the drive signal (voltage) 722 to piezo speaker(s) 1008) and a video output node 1020 to output a video signal 1012 to a display 1010. In different example embodiments, the IC(s) 1001 corresponds to a single integrated circuit, multiple integrated circuits, and/or a combination of integrated circuit components and discrete components.

Figure 11:
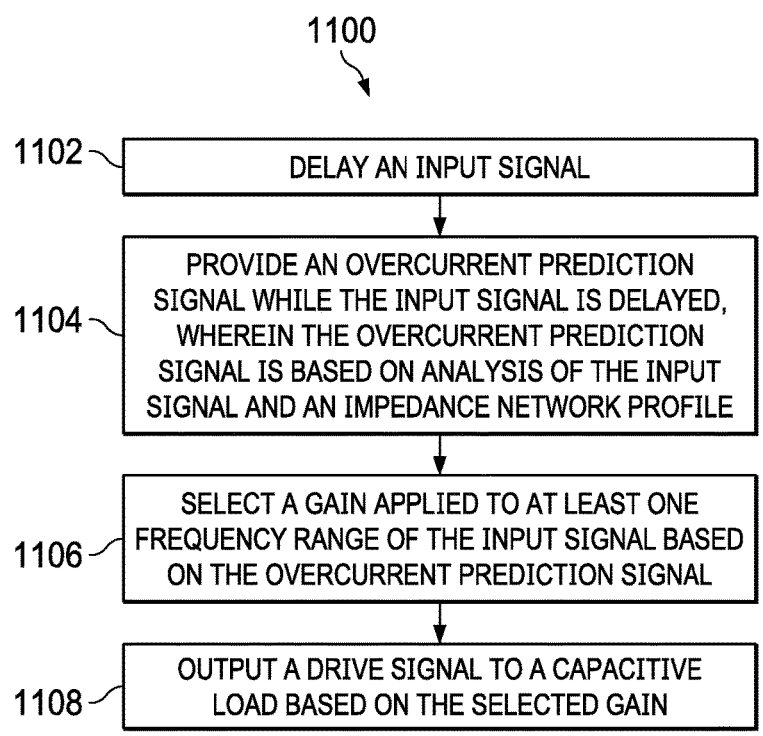
FIG. 11 is a flowchart showing a method in accordance with an example embodiment.

FIG. 11 is a flowchart showing a method 1100 in accordance with an example embodiment. As shown, the method 1100 includes delaying an input signal (voltage) at block 1102. At block 1104, an overcurrent prediction signal is provided while the input signal (voltage) is delayed, wherein the overcurrent prediction signal is based on analysis of the input signal (voltage) and an impedance network profile (e.g., the impedance network model 400 in FIG. 4A). At block 1106, a gain is selected for at least one frequency range of the input signal (voltage) based on the overcurrent prediction signal. At block 1108, a drive signal (voltage) is output to a capacitive load based on the selected gain.

In some example embodiments, the method 1100 includes filtering the input signal (voltage) to obtain first input signal (voltage) content associated with a first frequency range (e.g., high-frequency content from high-pass filter 842 in FIG. 8) and second input signal (voltage) content associated with a second frequency range (e.g., low-frequency content from low-pass filter 812), wherein the first frequency range is higher than the second frequency range, and wherein the overcurrent prediction signal is based on analysis of the first input signal (voltage) content.

In some example embodiments, the method 1100 includes storing the input signal or voltage (e.g., using the delay buffer 802 in FIG. 8); filtering the input signal to obtain first input signal (voltage) content associated with a first frequency range (e.g., high-frequency content from high-pass filter 806 in FIG. 8) and second input signal (voltage) content associated with a second frequency range (e.g., low-frequency content from low-pass filter 804 in FIG. 8), wherein the first frequency range is higher than the second frequency range; multiplying the first input signal (voltage) content by a first gain (e.g., by the multiply block 854) to obtain adjusted first input signal (voltage) content, wherein the first gain is based on the overcurrent prediction signal; multiplying the second input signal (voltage) content by a second gain (e.g., by the multiply block 852) to obtain adjusted second input signal (voltage) content; and combining the adjusted first input signal (voltage) content and the adjusted second input signal (voltage) content (e.g., by the summation block 856).

In some example embodiments, the method 1100 includes: filtering the input signal (voltage) to obtain first input signal (voltage) content associated with a first frequency range (e.g., high-frequency content from high-pass filter 842 in FIG. 8) and second input signal (voltage) content associated with a second frequency range (e.g., low-frequency content from low-pass filter 812 in FIG. 8), wherein the first frequency range is higher than the second frequency range; applying a first feedback loop (e.g., blocks 814, 816, 818, and 820 in FIG. 8) to the first input signal (voltage) content to generate the first gain; and applying a second feedback loop (e.g., blocks 844, 846, 848, and 850 in FIG. 8) to the second input signal (voltage) content to generate the second gain. In some example embodiments, the method 1100 includes applying weights to the first gain and the second gain based on weight selection operations that account for the first input signal (voltage) content and the second input signal (voltage) content.

In some example embodiments, an apparatus (e.g., a television or computer monitor) includes an input node (e.g., the input audio node 1014 in FIG. 10) configured to receive an input signal or voltage (e.g., the input audio signal 714 in FIG. 10). The apparatus also includes an prediction circuit (e.g., the overvoltage setting/overcurrent prediction circuit 506 in FIG. 5, the overvoltage setting/overcurrent prediction circuit 706 in FIGS. 7 and 10, or the overvoltage setting/overcurrent prediction circuit 706A in FIG. 8) coupled to the input node and configured to provide an overcurrent prediction signal (e.g., prediction signal(s) 718 in FIGS. 7 and 10, the first output signal 864 in FIG. 8, or the second output signals 866 in FIG. 8) based on analysis of the input signal (voltage). The apparatus also includes a delay circuit (e.g., the delay circuit 704 in FIGS. 7 and 10, or the delay circuit 704A in FIG. 8) coupled to the input node. The apparatus also includes a gain control circuit (e.g., the gain control circuit 708 in FIGS. 7 and 10, or the gain control circuit 708A in FIG. 8) coupled to an output of the delay circuit and configured to selectively adjust a gain applied to at least one frequency range of the input signal (voltage) based on the overcurrent prediction signal. The apparatus also includes a driver (e.g., the driver/other options circuit 710 in FIGS. 7 and 10, or block 870 in FIG. 8) coupled to an output of the gain control circuit, where the driver provides a drive signal or voltage (e.g., the drive signal 722 in FIGS. 7 and 10, or the drive signal 872 in FIG. 8) based on an output (e.g., the control signals 720 in FIGS. 7 and 10, or the output signal 868 in FIG. 8) of the gain control circuit. The apparatus also includes a capacitive load (e.g., the piezo speaker 304 in FIG. 5A, the capacitive load 712 in FIG. 7, the piezo speaker(s) 1008 in FIG. 10) coupled to an output of the driver and configured to receive the drive signal (voltage).

In some example embodiments, the prediction circuit is configured to filter the input signal (voltage) to obtain first input signal (voltage) content associated with a first frequency range (e.g., high-frequency content from the high-pass filter 842) and second input signal (voltage) content associated with a second frequency range (e.g., low-frequency content from the low-pass filter 812), wherein the first frequency range is higher than the second frequency range, and wherein the overcurrent prediction signal is based on analysis of the first input signal (voltage) content.

In some example embodiments, the delay circuit includes: a delay buffer (e.g., the delay buffer 802 in FIG. 8); a low-pass filter (e.g., the low-pass filter 804 in FIG. 8) coupled to an output of the delay buffer; and a high-pass filter (e.g., the high-pass filter 806 in FIG. 8) coupled to the output of the delay buffer. In some example embodiments, the gain control circuit includes a first multiplier (e.g., the multiply block 852 in FIG. 8) coupled to an output of the low-pass filter; a second multiplier (e.g., the multiply block 854 in FIG. 8) coupled to an output of the high-pass filter; and a summation circuit (e.g., the summation block 856 in FIG. 8) coupled to outputs of the first and second multipliers.

In some example embodiments, the prediction circuit includes: a low-pass filter (e.g., the low-pass filter 812 in FIG. 8) coupled to the input node; a first feedback loop (e.g., blocks 814, 816, 818, and 820 in FIG. 8) coupled to an output of the low-pass filter; a high-pass filter (e.g., the high-pass filter 842 in FIG. 8) coupled to the input node; a second feedback loop (e.g., blocks 844, 846, 848, and 850 in FIG. 8) coupled to an output of the high-pass filter; and a weight selection controller (e.g., the weight selection controller 822 in FIG. 8) coupled to the first and second feedback loops.

In some example embodiments, the first feedback loop includes a third multiplier block (e.g., the multiply block 814 in FIG. 8); a first attack/decay block (e.g., the attack/decay block 816 in FIG. 8) coupled to the third multiplier block; a first smooth block (e.g., the smooth block 818 in FIG. 8) coupled to the first attach/decay block; and a first minimum block (e.g., the minimum block 820 in FIG. 8) coupled to the first smooth block, wherein an output of the first minimum block is provided to the third multiplier block (e.g., (e.g., the multiply block 814) and to the first multiplier block (e.g., the multiply block 852 in FIG. 8) of the gain control circuit. In some example embodiments, the second feedback loop includes: a fourth multiplier block (e.g., the multiply block 844 in FIG. 8); a second attack/decay block (e.g., the attack/decay block 846 in FIG. 8) coupled to the fourth multiplier block; a second smooth block (e.g., the smooth block 848 in FIG. 8) coupled to the second attack/decay block; and a second minimum block (e.g., the minimum block 850 in FIG. 8) coupled to the second smooth block, wherein an output of the second minimum block is provided to fourth multiplier block (e.g., the multiply block 844 in FIG. 8) and to the second multiplier block (e.g., the multiply block 854 in FIG. 8) of the gain control circuit.

In some example embodiments, the weight selection controller includes: a summation block (e.g., the summation block 824 in FIG. 8); a voltage-to-current transfer function block (e.g., the voltage-to-current transfer function block 826 in FIG. 8) coupled to the summation block; a third attack/decay block (e.g., the attack/decay block 828 in FIG. 8) coupled to the voltage-to-current transfer function block;

a third smooth block (e.g., the smooth block 830 in FIG. 8) coupled to the third attach/decay block; a first weight block (e.g., the low-frequency weight block 832 in FIG. 8) coupled to the third smooth block, where an output of the first weight block is provided to the first minimum block; and a second weight block (e.g., the high-frequency weight block 834 in FIG. 8) coupled to the third smooth block, where an output of the second weight block is provided to the second minimum block.

In some example embodiments, the apparatus also includes: a display (e.g., the display 1010 in FIG. 10); and a housing (e.g., a television or computer monitor housing), where the capacitive load is a piezo speaker that is mechanically coupled to the display to propagate audio signals (voltages). In some example embodiments, the input node, the prediction circuit, the delay circuit, the gain control circuit are components of an integrated circuit. In some example embodiments, the operations of the prediction circuit, the delay circuit, the gain control circuit are performed by a DSP.

In some example embodiments, an integrated circuit includes: an input node (e.g., the input audio node 1014) configured to receive an input signal or voltage (e.g., the input audio signal 714); a control circuit (e.g., the control circuit 504 in FIG. 5A, the control circuit 702 in FIGS. 7 and 10, the or the control circuit 1002 in FIG. 10) configured to: delay the input signal (voltage); provide an overcurrent prediction signal (e.g., the prediction signal(s) 718 in FIGS. 7 and 10) while the input signal (voltage) is delayed, where the overcurrent prediction signal is based on analysis of the input signal (voltage) and an impedance network profile (e.g., the impedance network model 400 in FIG. 4A); select a gain (e.g., using the first and second outputs signals 864 and 866 in FIG. 8) applied to at least one frequency range of the input signal (voltage) based on the overcurrent prediction signal; and output a drive signal or voltage (e.g., the drive signal 722 in FIGS. 7 and 10) to a capacitive load based on the selected gain.

In some example embodiments, the control circuit is configured to filter the input signal (voltage) to obtain high-frequency content (e.g., the high-frequency content from the high-pass filter 842 in FIG. 8) and low-frequency content (e.g., low-frequency content from the low-pass filter 812 in FIG. 8), wherein the overcurrent prediction signal is based on analysis of the high-frequency content. The control circuit is further configured to: store the input signal or voltage (e.g., using the delay buffer 802 in FIG. 8); filter the input signal (voltage) to obtain high-frequency content (e.g., high-frequency content from the high-pass filter 806 in FIG. 8) and low-frequency content (e.g., low-frequency content from the low-pass filter 804 in FIG. 8); multiply the high-frequency content by a first gain (e.g., the second output signal 866 or related value in FIG. 8) to obtain adjusted high-frequency content, wherein the first gain is based on the overcurrent prediction signal; multiply the low-frequency content by a second gain (e.g., the first output signal 864 or related value in FIG. 8) to obtain adjusted low-frequency content; and combine (e.g., using the summation block 856 in FIG. 8) the adjusted high-frequency content and the adjusted low-frequency content.

In some example embodiments, the control circuit is further configured to: filter the input signal (voltage) to obtain high-frequency content (e.g., using the high-pass filter 842 in FIG. 8) and low-frequency content (e.g., using the low-pass filter 812 in FIG. 8); apply a first feedback loop (e.g., blocks 814, 816, 818, and 820) to the high-frequency content to generate the first gain; and apply a second feedback loop (e.g., blocks 844, 846, 848, and 850) to the low-frequency content to generate the second gain. In some example embodiments, the control circuit is further configured to apply weights to the first gain and the second gain based on weight selection operations (e.g., the operations of the weight selection controller 822 in FIG. 8) that account for the low-frequency content and the high-frequency content.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ."

The term "couple" is used throughout the specification. The term may cover connections, communications, or signal paths that enable a functional relationship consistent with the description of the present disclosure. For example, if device A generates a signal to control device B to perform an action, in a first example device A is coupled to device B by direct connection, or in a second example device A is coupled to device B through intervening component C if intervening component C does not alter the functional relationship between device A and device B such that device B is controlled by device A via the control signal generated by device A.

The above discussion is meant to be illustrative of the principles and various embodiments of the present invention. Numerous variations and modifications will become apparent to those skilled in the art once the above disclosure is fully appreciated.

What is claimed is:

1. An apparatus, comprising:
    a prediction circuit having an input and configured to provide an overcurrent prediction voltage based on an input voltage on the input;
    a delay circuit coupled to the input of the prediction circuit; and
    a gain control circuit coupled to an output of the delay circuit and configured to selectively adjust a gain applied to at least one frequency range of the input voltage on the input of the prediction circuit and based on the overcurrent prediction voltage;
    a driver coupled to an output of the gain control circuit; and
    a capacitive load coupled to an output of the driver.

2. The apparatus of claim 1, in which the prediction circuit is configured to filter the input voltage to obtain first input voltage content associated with a first frequency range and second input voltage content associated with a second frequency range, wherein the first frequency range is higher than the second frequency range, and wherein the overcurrent prediction is based on analysis of the first input content.

3. The apparatus of claim 1, in which the delay circuit includes:
    a delay buffer;
    a first low-pass filter coupled to an output of the delay buffer; and
    a first high-pass filter coupled to the output of the delay buffer.

4. The apparatus of claim 3, in which the gain control circuit includes:
    a first multiplier coupled to an output of the first low-pass filter;

a second multiplier coupled to an output of the first high-pass filter; and
a summation circuit coupled to outputs of the first and second multipliers.

5. The apparatus of claim 4, in which the prediction circuit includes:
a second low-pass filter coupled to the input;
a first feedback loop coupled to an output of the second low-pass filter;
a second high-pass filter coupled to the input;
a second feedback loop coupled to an output of the second high-pass filter; and
a weight selection controller coupled to the first and second feedback loops.

6. The apparatus of claim 5, in which the first feedback loop includes:
a third multiplier block;
a first attack/decay block coupled to the third multiplier block;
a first smooth block coupled to the first attach/decay block; and
a first minimum block coupled to the first smooth block, wherein an output of the first minimum block is provided to the third multiplier block and to the first multiplier block of the gain control circuit, and
wherein the second feedback loop includes:
a fourth multiplier block;
a second attack/decay block coupled to the fourth multiplier block;
a second smooth block coupled to the second attack/decay block; and
a second minimum block coupled to the second smooth block, wherein an output of the second minimum block is provided to the fourth multiplier block and to the second multiplier block of the gain control circuit.

7. The apparatus of claim 6, in which the weight selection controller includes:
a summation block;
a voltage-to-current transfer function block coupled to the summation block;
a third attack/decay block coupled to the voltage-to-current transfer function block;
a third smooth block coupled to the third attach/decay block;
a first weight block coupled to the third smooth block, wherein an output of the first weight block is provided to the first minimum block; and
a second weight block coupled to the third smooth block, wherein an output of the second weight block is provided to the second minimum block.

8. The apparatus of claim 1, including a display, in which the capacitive load is a piezo speaker mechanically coupled to the display.

9. The apparatus of claim 1, in which the input, the prediction circuit, the delay circuit, and the gain control circuit are components of an integrated circuit.

10. The apparatus of claim 1, in which operations of the prediction circuit, the delay circuit, and the gain control circuit are performed by a digital signal processor (DSP).

11. An integrated circuit, comprising:
a control circuit having an input and configured to:
receive an input voltage on the input of the control circuit;
delay the input voltage;
provide an overcurrent prediction voltage while the input voltage is delayed, in which the overcurrent prediction voltage is based on the input voltage and an impedance network profile;
select a gain for at least one frequency range of the input voltage based on the overcurrent prediction voltage; and
output a drive voltage based on the selected gain.

12. The integrated circuit of claim 11, in which the control circuit is configured to filter the input voltage to obtain low-frequency content and high-frequency content, and wherein the overcurrent prediction voltage is based on analysis of the high-frequency content.

13. The integrated circuit of claim 11, in which the control circuit is further configured to:
store the input voltage;
filter the input voltage to obtain low-frequency content and high-frequency content;
multiply the high-frequency content by a first gain to obtain adjusted high-frequency content, wherein the first gain is based on the overcurrent prediction voltage;
multiply the low-frequency content by a second gain to obtain adjusted low-frequency content; and
combine the adjusted low-frequency content and the adjusted high-frequency content.

14. The integrated circuit of claim 13, in which the control circuit is further configured to:
apply a first feedback loop to the high-frequency content to generate the first gain; and
apply a second feedback loop to the low-frequency content to generate the second gain.

15. The integrated circuit of claim 14, in which the control circuit is further configured to apply weights to the first gain and the second gain based on weight selection operations that account for the high-frequency content and the low-frequency content.

16. A method, comprising:
delaying an input voltage;
providing an overcurrent prediction while the input voltage is delayed, where the overcurrent prediction voltage is based on analysis of the input voltage and a capacitive load profile;
selecting a gain for at least one frequency range of the input voltage based on the overcurrent prediction voltage; and
outputting a drive voltage based on the selected gain.

17. The method of claim 16, including filtering the input voltage to obtain first input voltage content associated with a first frequency range and second input voltage content associated with a second frequency range, wherein the first frequency range is higher than the second frequency range, and wherein the overcurrent prediction is based on the first input voltage content.

18. The method of claim 16, including:
storing the input voltage;
filtering the input voltage to obtain first input voltage content associated with a first frequency range and second input voltage content associated with a second frequency range, wherein the first frequency range is higher than the second frequency range;
multiplying the first input voltage content by a first gain to obtain adjusted first input voltage content, wherein the first gain is based on the overcurrent prediction voltage;
multiplying the second input voltage content by a second gain to obtain adjusted second input voltage content; and
combining the adjusted first input voltage content and the adjusted second input voltage content.

19. The method of claim 18, including:
applying a first feedback loop to the first input voltage content to generate the first gain; and
applying a second feedback loop to the second input voltage content to generate the second gain.

20. The method of claim 19, including applying weights to the first gain and the second gain based on a weight selection operations that account for the first input voltage content and the second input voltage content.

* * * * *